United States Patent
Tajima

(10) Patent No.: US 12,224,621 B2
(45) Date of Patent: Feb. 11, 2025

(54) POWER SUPPLY DEVICE

(71) Applicant: TMEIC Corporation, Chuo-ku (JP)

(72) Inventor: Hidenobu Tajima, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 236 days.

(21) Appl. No.: 17/615,178

(22) PCT Filed: Dec. 26, 2019

(86) PCT No.: PCT/JP2019/051214
§ 371 (c)(1),
(2) Date: Nov. 30, 2021

(87) PCT Pub. No.: WO2021/130981
PCT Pub. Date: Jul. 1, 2021

(65) Prior Publication Data
US 2022/0239146 A1 Jul. 28, 2022

(51) Int. Cl.
*H02J 9/06* (2006.01)
*H02J 7/00* (2006.01)
*H02M 1/14* (2006.01)

(52) U.S. Cl.
CPC ............ *H02J 9/062* (2013.01); *H02J 7/0047* (2013.01); *H02M 1/14* (2013.01); *H02J 2207/20* (2020.01)

(58) Field of Classification Search
None
See application file for complete search history.

(56) References Cited

U.S. PATENT DOCUMENTS 10,693,316 B2 * 6/2020 Tamai ................... H02J 9/062
11,791,712 B2 * 10/2023 Amimoto ............. H02M 7/797
363/131

(Continued)

FOREIGN PATENT DOCUMENTS

CN 102187562 A 9/2011
CN 104348217 A 2/2015
(Continued)

OTHER PUBLICATIONS

Indian Office Action issued Aug. 2, 2022 in Indian Patent Application No. 202117052383, 6 pages.
(Continued)

*Primary Examiner* — Thomas J. Hiltunen
*Assistant Examiner* — Khareem E Almo
(74) *Attorney, Agent, or Firm* — Oblon, McClelland, Maier & Neustadt, L.L.P.

(57) ABSTRACT

A power supply device includes an inverter, a voltage converter, a capacitor, a current detector, a counter, and a controller. The inverter converts DC power into AC power and supplies the converted AC power to a load. The voltage converter performs voltage conversion for a DC voltage from a battery. The capacitor smoothes the DC voltage from the voltage converter and inputs the smoothed DC voltage to the inverter. The current detector detects a battery current flowing from the battery into the voltage converter. The counter measures a discharge time of the battery. The controller stops the voltage converter when the measured discharge time of the battery exceeds a discharge permissible time. Based on an output from the current detector, the controller sets the discharge permissible time to be shorter as the battery current is higher when the battery current exceeds a threshold value during discharging of the battery.

8 Claims, 7 Drawing Sheets

(56) References Cited

U.S. PATENT DOCUMENTS

| | | | | |
|---|---|---|---|---|
| 2016/0352127 A1* | 12/2016 | Prakash | ................. | H02J 9/062 |
| 2017/0087998 A1* | 3/2017 | Minamii | ............... | H02J 7/1423 |
| 2018/0102647 A1* | 4/2018 | Ohnishi | ................... | H02J 9/06 |
| 2019/0214847 A1* | 7/2019 | Tamai | .................... | H02J 9/062 |
| 2020/0366079 A1* | 11/2020 | Telefus | ................... | H02H 3/08 |
| 2021/0013796 A1* | 1/2021 | Amimoto | ............. | H02M 7/537 |
| 2022/0203852 A1* | 6/2022 | Murasato | ............. | H02J 7/0045 |

FOREIGN PATENT DOCUMENTS

| | | |
|---|---|---|
| JP | 2009-254038 A | 10/2009 |
| JP | 2011-72155 A | 4/2011 |
| WO | WO 2018/142579 A1 | 8/2018 |

OTHER PUBLICATIONS

International Search Report mailed on Mar. 24, 2020 in PCT/JP2019/051214 filed on Dec. 26, 2019 (2 pages).

Combined Chinese Office Action and Search Report issued Dec. 29, 2023, in corresponding Chinese Patent Application No. 201980097235.8 (with English Translation and English Translation of Category of Cited Documents), 14 pages.

Office Action issued Jan. 23, 2024, in corresponding Indian Patent Application No. 202117052383 (with English Translation), 2 pages.

Office Action dated Jun. 7, 2024, issued in counterpart to CN Application No. 201980097235.8, with machine English translation. (12 pages).

Office Action dated Sep. 2, 2024, issued in counterpart CN Application No. 201980097235.8, filed on Dec. 26, 2019, with English machine translation. (10 pages).

\* cited by examiner

POWER SUPPLY DEVICE

TECHNICAL FIELD

The present disclosure relates to a power supply device.

BACKGROUND ART

Japanese Patent Laying-Open No. 2011-72155 (PTL 1) discloses an uninterruptible power supply device that supplies alternating-current (AC) power to a load and charges a battery through a power converter when an AC power supply is in a normal state. The power converter serves to convert AC power into direct-current (DC) power and converts the DC power into AC power. The uninterruptible power supply device is configured to supply electric power discharged from the battery to the load through the power converter when a power interruption occurs in the AC power supply. The uninterruptible power supply device stops discharging of the battery when the voltage discharged from the battery becomes equal to or lower than a discharge cut-off voltage.

CITATION LIST

Patent Literature

PTL 1: Japanese Patent Laying-Open No. 2011-72155

SUMMARY OF INVENTION

Technical Problem

In the above-mentioned uninterruptible power supply device, the power converter includes a voltage converter (a step-up/step-down chopper) for performing voltage conversion for a DC voltage on the battery, and a capacitor for smoothing the DC voltage generated by the voltage converter. During discharging of the battery, the capacitor is repeatedly charged and discharged in accordance with switching control of a switching element included in the voltage converter, and thereby, a ripple current that cyclically increases and decreases flows through the capacitor. When this ripple current is generated, power loss occurs in an equivalent series resistance (ESR) inside the capacitor, so that the capacitor generates heat.

When the electric power supplied to the load increases during discharging of the battery, the electric power associated with charging and discharging of the capacitor also increases, so that the ripple current in the capacitor also increases. As a result, heat generation increases in the ESR of the capacitor, and thereby, the temperature of the capacitor rises, which may accelerate performance deterioration in the capacitor.

The present disclosure has been made to solve the above-described problems. An object of the present disclosure is to suppress a temperature rise in a capacitor included in a power supply device and smoothing a DC voltage from a voltage converter.

Solution to Problem

A power supply device according to the present disclosure includes an inverter, a voltage converter, a capacitor, a current detector, a counter, and a controller. The inverter converts DC power into AC power and supplies the AC power to a load. The voltage converter performs voltage conversion for a DC voltage from a battery. The capacitor smoothes the DC voltage from the voltage converter and inputs the smoothed DC voltage to the inverter. The current detector detects a battery current flowing from the battery into the voltage converter. The counter measures a discharge time of the battery. The controller controls the voltage converter. The controller stops the voltage converter when the measured discharge time of the battery exceeds a discharge permissible time. When the battery current exceeds a threshold value during discharging of the battery, the controller sets the discharge permissible time based on an output from the current detector such that the discharge permissible time is shorter as the battery current is higher.

Advantageous Effects of Invention

The present disclosure can suppress a temperature rise in a capacitor included in a power supply device and smoothing a DC voltage from a voltage converter.

DESCRIPTION OF EMBODIMENTS

Figure 1:
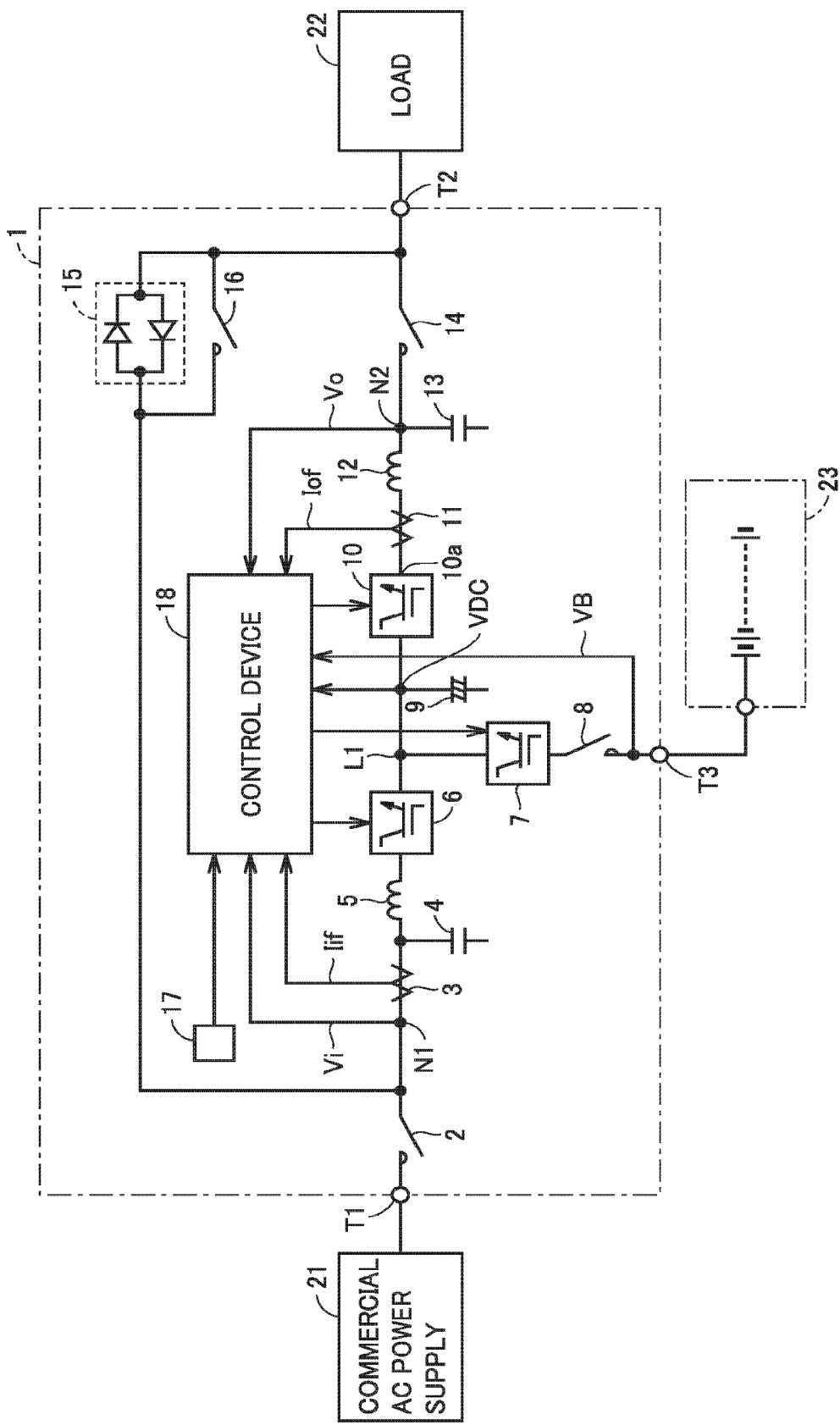
FIG. 1 is a circuit block diagram showing a configuration of an uninterruptible power supply device to which a power supply device according to an embodiment is applied.

The following describes embodiments of the present disclosure in detail with reference to the accompanying drawings. In the following description, the same or corresponding portions in the accompanying drawings will be denoted by the same reference characters, and the description thereof will not be basically repeated.

First Embodiment (Configuration of Uninterruptible Power Supply Device)

FIG. 1 is a circuit block diagram showing a configuration of an uninterruptible power supply device to which a power supply device according to an embodiment is applied. An uninterruptible power supply device 1 converts three-phase AC power from a commercial AC power supply 21 into DC power, then converts the DC power into three-phase AC power, and supplies the converted three-phase AC power to a load 22. FIG. 1 shows only circuits in a portion corresponding to one phase (for example, a U phase) among three phases (a U phase, a V phase, and a W phase) for simplicity of illustration in the drawings and description herein.

In FIG. 1, uninterruptible power supply device 1 includes an AC input terminal T1, an AC output terminal T2, and a battery terminal T3. AC input terminal T1 receives AC power of a commercial frequency from commercial AC power supply 21. AC output terminal T2 is connected to load 22. Load 22 is driven by AC power. Battery terminal T3 is connected to battery 23. Battery 23 stores DC power.

Uninterruptible power supply device 1 further includes electromagnetic contactors 2, 8, 14 and 16, current detectors 3 and 11, capacitors 4, 9 and 13, reactors 5 and 12, a converter 6, a bidirectional chopper 7, an inverter 10, a semiconductor switch 15, an operation module 17, and a control device 18.

Electromagnetic contactor 2 and reactor 5 are connected in series between AC input terminal T1 and the input node of converter 6. Capacitor 4 is connected to a node N1 between electromagnetic contactor 2 and reactor 5. Electromagnetic contactor 2 is turned on during use of uninterruptible power supply device 1, and turned off during maintenance of uninterruptible power supply device 1, for example.

The instantaneous value of an AC input voltage Vi appearing at a node N1 is detected by control device 18. Based on the instantaneous value of AC input voltage Vi, it is determined, for example, whether a power interruption occurs or not. Current detector 3 detects an AC input current Ii flowing through node N1, and supplies a signal Iif showing the detected value to control device 18.

Capacitor 4 and reactor 5 constitute a low-pass filter for: allowing AC power of a commercial frequency to pass from commercial AC power supply 21 to converter 6; and preventing a signal of a switching frequency generated in converter 6 from passing through commercial AC power supply 21.

Converter 6 is controlled by control device 18 to convert three-phase AC power into DC power (rectification) and output the converted DC power to a DC line L1 in a normal state in which AC power is supplied from commercial AC power supply 21. During a power interruption in which supply of AC power from commercial AC power supply 21 is stopped, the operation of converter 6 is stopped. The voltage output from converter 6 can be controlled to a desired value.

Capacitor 9 is connected to DC line L1 and smoothes the voltage on DC line L1. The instantaneous value of a DC voltage VDC appearing on DC line L1 is detected by control device 18. DC line L1 is connected to the node on the high voltage side of bidirectional chopper 7. The node on the low voltage side of bidirectional chopper 7 is connected to battery terminal T3 through electromagnetic contactor 8.

Electromagnetic contactor 8 is turned on during use of uninterruptible power supply device 1, and turned off during maintenance of uninterruptible power supply device 1 and battery 23, for example. The instantaneous value of the voltage across terminals (hereinafter also referred to as a "battery voltage") VB of battery 23 that appears at battery terminal T3 is detected by control device 18.

Bidirectional chopper 7 is controlled by control device 18 to supply the DC power generated by converter 6 to battery 23 to be stored therein in a normal state in which the AC power is supplied from commercial AC power supply 21, and to supply the DC power of battery 23 to inverter 10 through DC line L1 during a power interruption. Bidirectional chopper 7 corresponds to one example of a "voltage converter".

When DC power is stored in battery 23, bidirectional chopper 7 steps down DC voltage VDC on DC line L1 and supplies the stepped-down DC voltage VDC to battery 23. When the DC power of battery 23 is supplied to inverter 10, bidirectional chopper 7 steps up battery voltage VB and outputs the stepped-up battery voltage VB to DC line L1. DC line L1 is connected to an input node of inverter 10.

Inverter 10 is controlled by control device 18 to convert the DC power supplied from converter 6 or bidirectional chopper 7 through DC line L1 into AC power of a commercial frequency and output the converted AC power. In other words, in a normal state, inverter 10 converts the DC power supplied from converter 6 through DC line L1 into AC power. Also, during a power interruption, inverter 10 converts the DC power supplied from battery 23 through bidirectional chopper 7 into AC power. The voltage output from inverter 10 can be controlled to a desired value.

Inverter 10 has an output node 10a connected to one terminal of reactor 12. Reactor 12 has the other terminal (a node N2) connected to AC output terminal T2 through electromagnetic contactor 14. Capacitor 13 is connected to node N2.

Current detector 11 detects an instantaneous value of an output current Io from inverter 10 and supplies a signal I of showing the detected value to control device 18. The instantaneous value of an AC output voltage Vo appearing at node N2 is detected by control device 18.

Reactor 12 and capacitor 13 constitute a low-pass filter for: allowing the AC power of a commercial frequency generated by inverter 10 to pass through AC output terminal T2; and preventing a signal of a switching frequency generated by inverter 10 from passing through AC output terminal T2. Inverter 10, reactor 12, and capacitor 13 constitute an inverter circuit.

Electromagnetic contactor 14 is controlled by control device 18 to be turned on in an inverter power feeding mode in which AC power generated by inverter 10 is supplied to load 22, and to be turned off in a bypass power feeding mode in which AC power from commercial AC power supply 21 is supplied to load 22.

Semiconductor switch 15 includes a thyristor and is connected between AC input terminal T1 and AC output terminal T2. Electromagnetic contactor 16 is connected in parallel with semiconductor switch 15. Semiconductor switch 15 is controlled by control device 18 to be turned off in a normal state and to be instantaneously turned on upon occurrence of a failure in inverter 10, to thereby supply AC power from commercial AC power supply 21 to load 22. Semiconductor switch 15 is turned off after a prescribed time has elapsed since semiconductor switch 15 was turned on.

Reactor 12 and capacitor 13 constitute a low-pass filter for allowing the AC power of a commercial frequency generated by inverter 10 to pass through AC output terminal T2, and preventing a signal of a switching frequency generated by inverter 10 from passing through AC output terminal T2.

Electromagnetic contactor 14 is controlled by control device 18 to be turned on in the inverter power feeding mode and to be turned off in the bypass power feeding mode.

Electromagnetic contactor 16 is turned off in the inverter power feeding mode and turned on in the bypass power feeding mode. When a failure occurs in inverter 10, electromagnetic contactor 16 is turned on to supply the AC power from commercial AC power supply 21 to load 22. In other words, when a failure occurs in inverter 10, semiconductor switch 15 is instantaneously turned on for a prescribed time and electromagnetic contactor 16 is turned on.

This is for the purpose of preventing semiconductor switch 15 from being overheated and thereby damaged.

Operation module 17 includes a plurality of buttons operated by a user of uninterruptible power supply device 1 and an image display unit on which various pieces of information are displayed. The user operates operation module 17 to thereby allow the power supply of uninterruptible power supply device 1 to be turned on and off, and allow one mode to be selected from the bypass power feeding mode and the inverter power feeding mode.

Control device 18 can be configured, for example, by a microcomputer and the like. By way of example, control device 18 incorporates a memory and a central processing unit (CPU), each of which is not shown, and is capable of executing a control operation (described later) by software processing implemented by the CPU executing a program stored in advance in the memory. Alternatively, the control operation can also be partially or entirely implemented by hardware processing using an incorporated and dedicated electronic circuit or the like in place of software processing.

Control device 18 controls the entire uninterruptible power supply device 1 based on signals from operation module 17, AC input voltage Vi, AC input current Ii, DC voltage VDC, battery voltage VB, AC output current Io, AC output voltage Vo, and the like. In other words, based on the detected value of AC input voltage Vi, control device 18 detects whether a power interruption occurs or not, and controls converter 6 and inverter 10 in synchronization with the phase of AC input voltage Vi.

Further, in a normal state in which the AC power is supplied from commercial AC power supply 21, control device 18 controls converter 6 such that DC voltage VDC reaches a desired reference voltage VDCr. Also, during a power interruption in which supply of the AC power from commercial AC power supply 21 is stopped, control device 18 stops the operation of converter 6.

Further, in a normal state, control device 18 controls bidirectional chopper 7 such that battery voltage VB reaches a desired reference voltage VBr. Also, during a power interruption, control device 18 controls bidirectional chopper 7 such that DC voltage VDC reaches a desired reference voltage VDCr.

Then, the operation of uninterruptible power supply device 1 will be described. When the inverter power feeding mode is selected in a normal state in which AC power is supplied from commercial AC power supply 21, semiconductor switch 15 and electromagnetic contactor 16 are turned off, and electromagnetic contactors 2, 8, and 14 are turned on.

The AC power supplied from commercial AC power supply 21 is converted by converter 6 into DC power. The DC power generated by converter 6 is supplied by bidirectional chopper 7 to be stored in battery 23 and to be fed to inverter 10. Inverter 10 converts the DC power supplied from converter 6 into AC power and supplies the converted AC power to load 22. Load 22 is driven by the AC power supplied from inverter 10.

Figure 2:
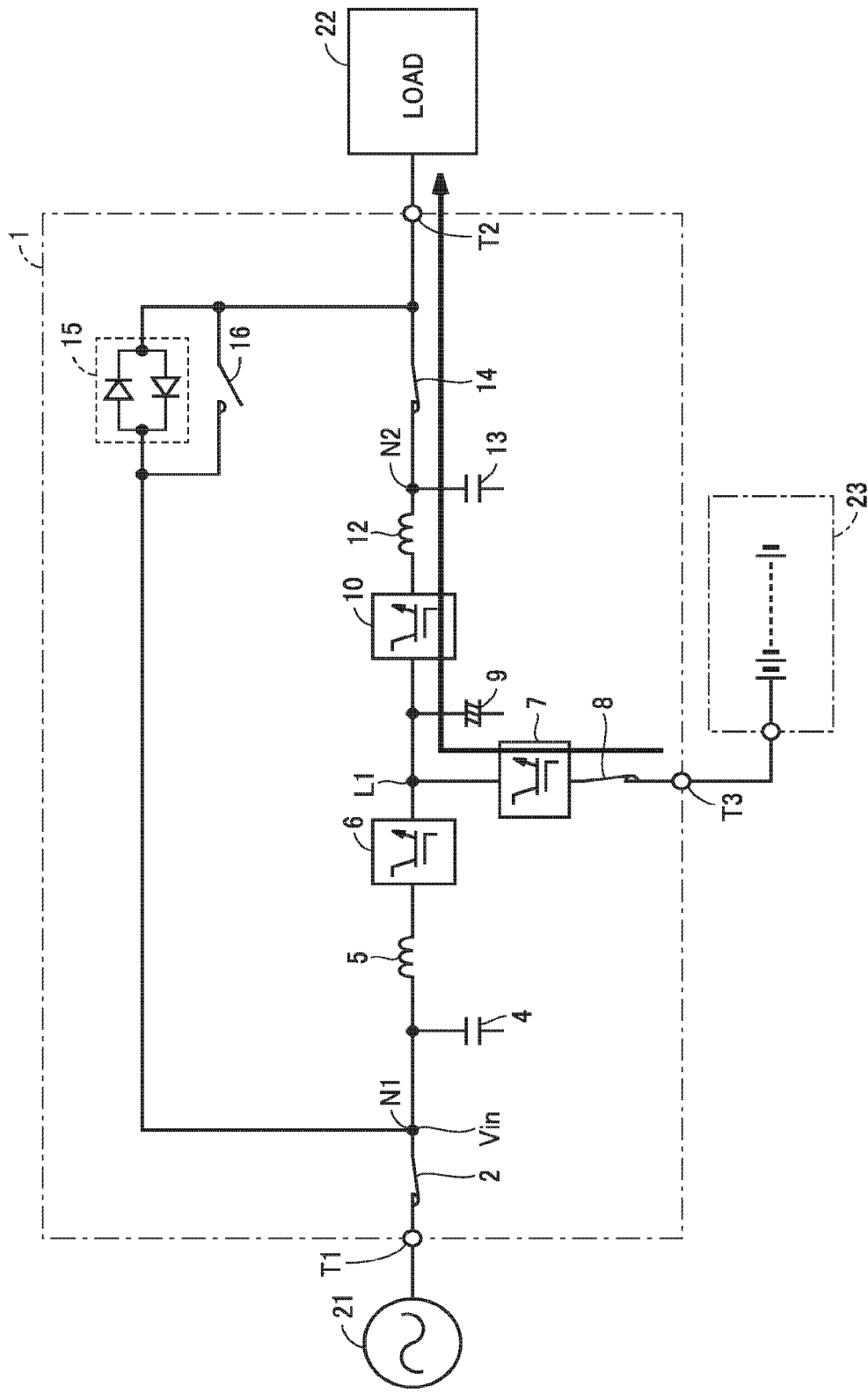
FIG. 2 is a diagram for illustrating a flow of electric power during a power interruption of a commercial AC power supply.

FIG. 2 is a diagram for illustrating a flow of electric power during a power interruption of commercial AC power supply 21. When supply of the AC power from commercial AC power supply 21 is stopped, that is, when a power interruption occurs, the operation of converter 6 is stopped, and the DC power of battery 23 is supplied by bidirectional chopper 7 to inverter 10. Inverter 10 converts the DC power from bidirectional chopper 7 into AC power and supplies the converted AC power to load 22. Thus, the operation of load 22 can be continued in a time period during which DC power is stored in battery 23.

Specifically, control device 18 controls bidirectional chopper 7 to step up battery voltage VB and output the stepped-up battery voltage VB to DC line L1. Control device 18 further controls inverter 10 to convert the DC power supplied through DC line L1 into three-phase AC power of a commercial frequency. Thereby, as indicated by an arrow in FIG. 2, the DC power of battery 23 is converted into three-phase AC power of a commercial frequency and then supplied to load 22 through electromagnetic contactor 14. The operation of converter 6 is stopped. When the remaining capacity of battery 23 reaches a predetermined lower limit value, control device 18 stops the operations of bidirectional chopper 7 and inverter 10. Thus, uninterruptible power supply device 1 ends power feeding to load 22.

Figure 3:
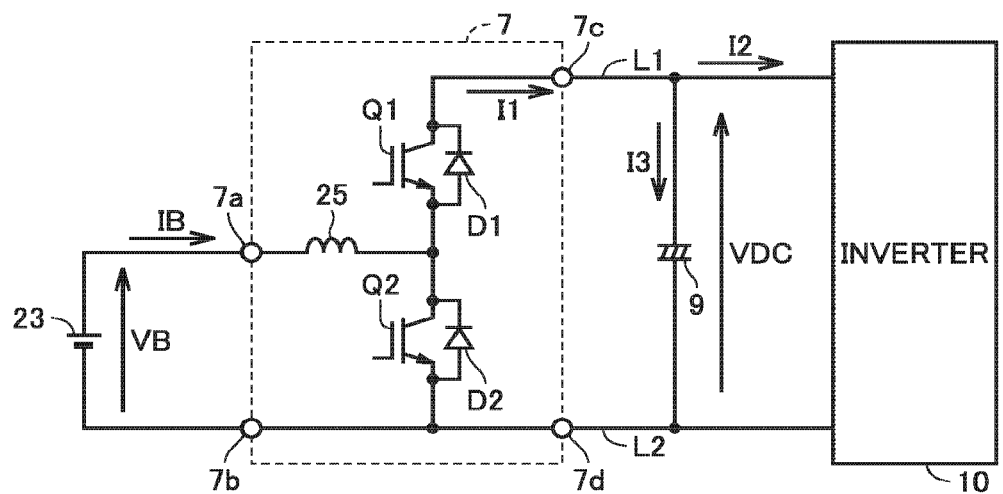
FIG. 3 is a circuit block diagram showing a configuration example of a bidirectional chopper shown in FIG. 1.

FIG. 3 is a circuit block diagram showing a configuration example of bidirectional chopper 7 shown in FIG. 1. In FIG. 3, a DC line L1 on the positive side and a DC line L2 on the negative side are connected between bidirectional chopper 7 and inverter 10. Capacitor 9 is connected between DC lines L1 and L2.

In a normal state in which AC power is supplied from commercial AC power supply 21, bidirectional chopper 7 steps down DC voltage VDC between DC lines L1 and L2, and applies the stepped-down DC voltage VDC to battery 23. Bidirectional chopper 7 supplies the DC power generated by converter 6 to battery 23 to be stored therein.

On the other hand, when a power interruption occurs in commercial AC power supply 21, bidirectional chopper 7 steps up battery voltage VB and applies the stepped-up battery voltage VB between DC lines L1 and L2. Bidirectional chopper 7 supplies the DC power of battery 23 to inverter 10 through DC line L1.

Bidirectional chopper 7 includes input nodes 7a and 7b, output nodes 7c and 7d, insulated gate bipolar transistors (IGBT) Q1 and Q2, diodes D1 and D2, and a reactor 25. The IGBTs and the diodes correspond to one example of a "switching element". The switching element can be configured by connecting freewheeling diodes (FWD) in antiparallel to any self-arc-extinguishing type semiconductor switching element.

Input node 7a is connected to the positive electrode of battery 23, and input node 7b is connected to the negative electrode of battery 23. Input node 7c is connected to DC line L1, and input node 7d is connected to DC line L2.

IGBT Q1 has a collector connected to DC line L1 and an emitter connected to the collector of IGBT Q2. IGBT Q2 has an emitter connected to DC line L2. Reactor 25 is connected between input node 7a and the emitter of IGBT Q1 (the collector of IGBT Q2). IGBT Q1 and IGBT Q2 are controlled by control device 18 to be turned on and off alternately at a prescribed switching frequency.

Figure 4:
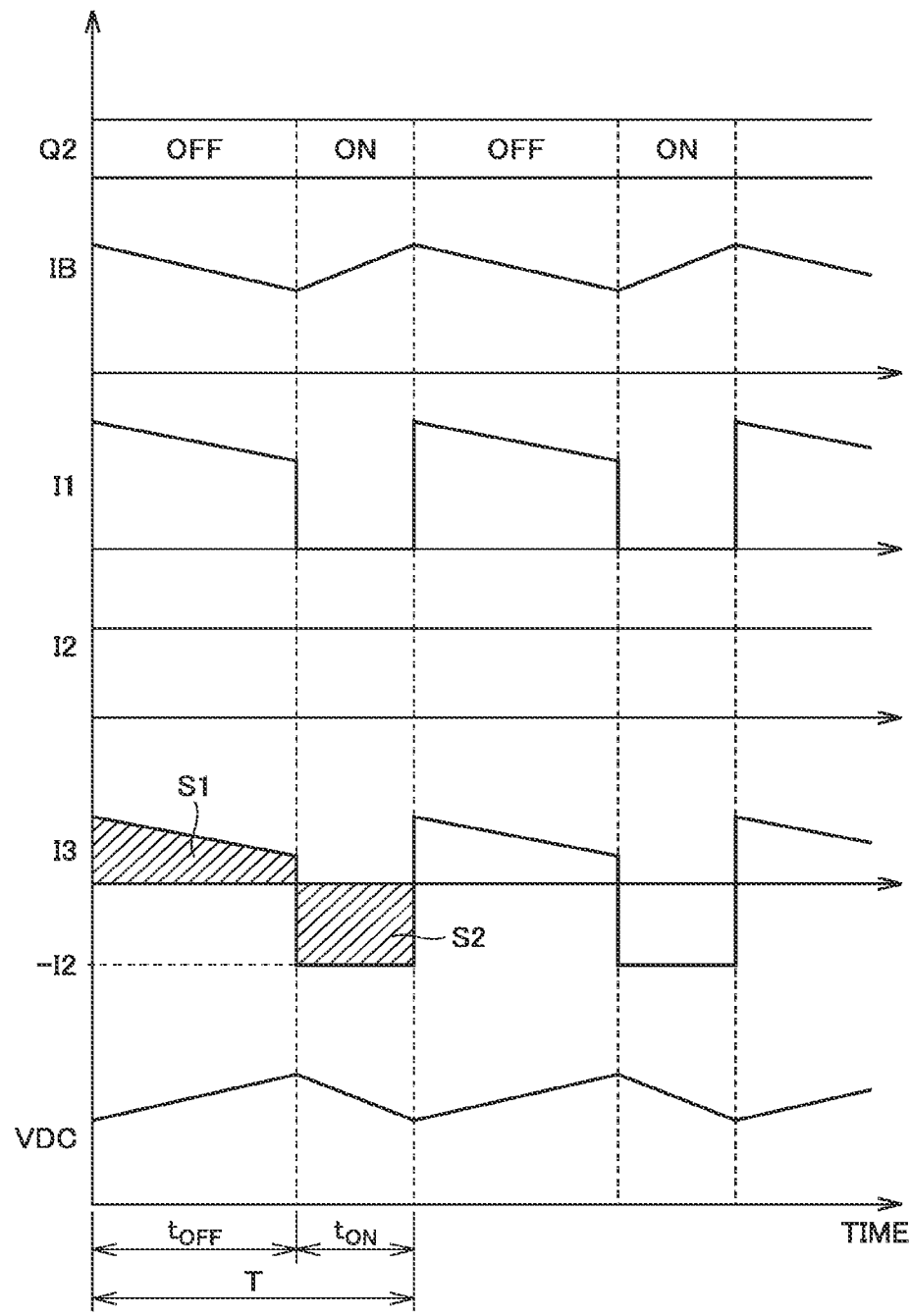
FIG. 4 is a waveform diagram for illustrating the operation of the bidirectional chopper during a power interruption of the commercial AC power supply.

FIG. 4 is a waveform diagram for illustrating the operation of bidirectional chopper 7 during a power interruption of commercial AC power supply 21. In FIG. 4, IB shows a battery current, and I1 shows a current flowing through diode D1. I2 shows a current input to inverter 10, and I3 shows a current flowing through capacitor 9. FIG. 4 schematically shows changes over time in currents IB, I1 to I3 and DC voltage VDC, which occur when IGBT Q2 is turned on or off.

When a power interruption occurs in commercial AC power supply 21, bidirectional chopper 7 steps up battery voltage VB and applies the stepped-up battery voltage VB between DC lines L1 and L2. Specifically, bidirectional chopper 7 steps up battery voltage VB in accordance with the time period during which IGBT Q2 is turned on, and then, applies the stepped-up battery voltage VB between DC lines L1 and L2. One cycle T during which IGBT Q2 is turned on and off corresponds to the sum of a period $t_{ON}$ during which IGBT Q2 is turned on and a period $t_{OFF}$ during which IGBT Q2 is turned off. One cycle T is set depending on the switching frequency. The ratio of period $t_{ON}$ in one cycle T is also referred to as an "on-duty".

In period $t_{ON}$ during which IGBT Q2 is turned on, electric power is accumulated in reactor 25. In period $t_{OFF}$ during which IGBT Q2 is turned off, the electric power accumulated in reactor 25 is applied between DC lines L1 and L2. The on-duty of IGBT Q2 is increased to thereby increase the electric power accumulated in reactor 25, so that a higher voltage can be output. Thus, by controlling the on-duty of IGBT Q2, DC voltage VDC can be controlled to any voltage ranging from battery voltage VB as a lower limit value up to an upper limit value that is set based on the element breakdown voltage of the IGBT and the like. Thereby, voltage VDC input into inverter 10 can be variable in accordance with the operating state of load 22.

In capacitor 9, current I1 reaches zero in period $t_{ON}$ during which IGBT Q2 is turned on. Thus, the electric power accumulated in capacitor 9 is supplied to inverter 10. Due to such discharging of capacitor 9, the voltage across the terminals of capacitor 9 (corresponding to DC voltage VDC) lowers. In period $t_{ON}$, current I3 and current I2 have the same magnitude.

On the other hand, in period $t_{OFF}$ during which IGBT Q2 is turned off, capacitor 9 is charged with the electric power output from reactor 25, and thereby, the voltage across the terminals of capacitor 9 (corresponding to DC voltage VDC) rises. In period $t_{OFF}$, current I1 becomes equal to the sum of current I2 and current I3.

In the waveform of current I3 flowing through capacitor 9, an area S1 corresponds to the electric charge accumulated in capacitor 9, and an area S2 corresponds to the electric charge discharged from capacitor 9. Area S1 is basically equal to area S2.

By repeating charging and discharging of capacitor 9 in accordance with switching control of IGBTs Q1 and Q2, a ripple current that cyclically increases and decreases flows through capacitor 9. The cycle in which the ripple current increases and decreases is equivalent to the cycle in which IGBTs Q1 and Q2 are controlled. Inside capacitor 9, a voltage is generated that is given as the product of the equivalent series resistance (ESR) and the ripple current. This voltage is superimposed as a voltage variation on DC voltage VDC. When the ripple current occurs, power loss occurs in the ESR of capacitor 9, which leads to heat generation in capacitor 9.

During a power interruption of commercial AC power supply 21, as the electric power supplied from inverter 10 to load 22 increases, the electric power associated with charging and discharging of capacitor 9 also increases. Bidirectional chopper 7 increases the on-duty of IGBT Q2 to thereby increase the electric power accumulated in reactor 25. In such a situation, since the ripple current in capacitor 9 also increases, the loss occurring in the ESR of capacitor 9 increases. Such a loss generates heat to thereby raise the temperature of capacitor 9, which may accelerate performance deterioration in capacitor 9.

Thus, uninterruptible power supply device 1 according to the present embodiment is configured to supply electric power to load 22 in consideration of the temperature rise in capacitor 9 during a power interruption of commercial AC power supply 21. Thereby, the performance deterioration in capacitor 9 is suppressed.

Figure 5:
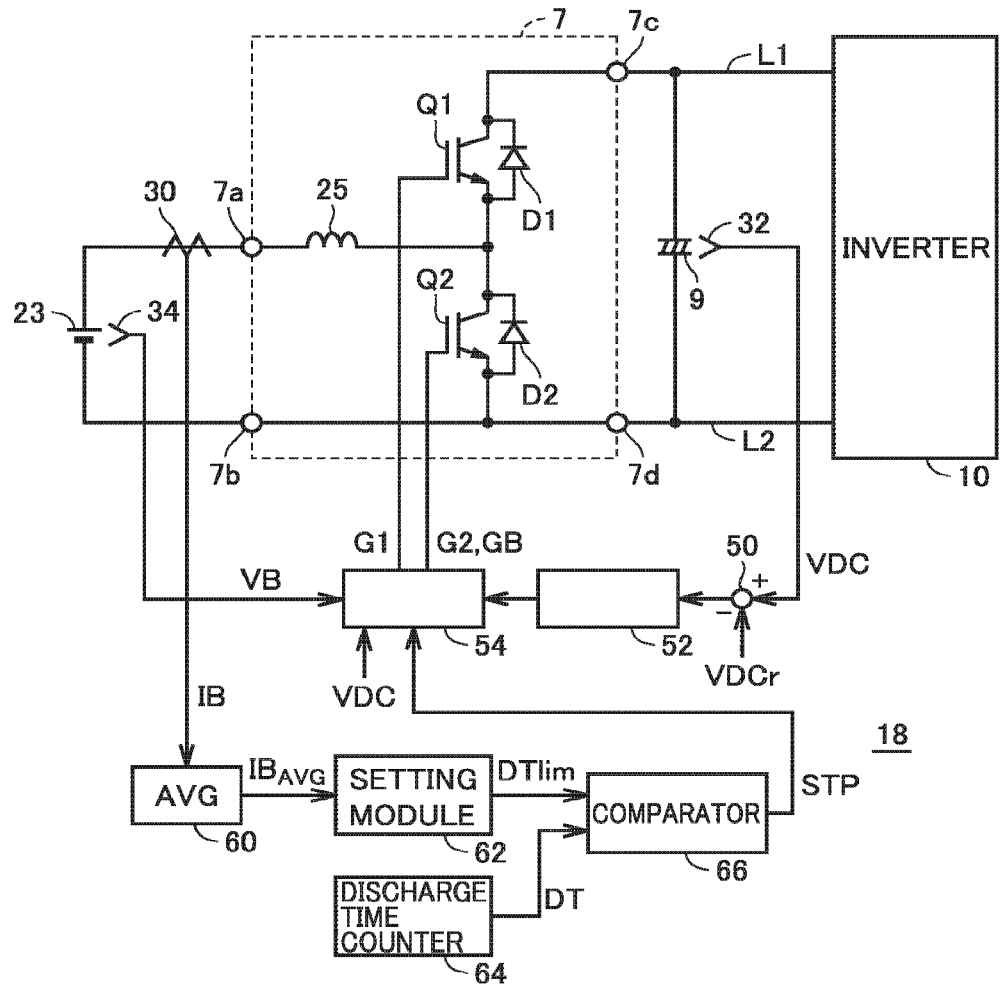
FIG. 5 is a circuit block diagram showing a configuration of a controller that controls the bidirectional chopper shown in FIG. 1.

FIG. 5 is a circuit block diagram showing a configuration of a controller that controls bidirectional chopper 7 shown in FIG. 1. The controller is included in control device 18. In FIG. 5, uninterruptible power supply device 1 further includes a current detector 30 and voltage detectors 32 and 34.

Current detector 30 detects an instantaneous value of a current IB flowing through battery 23 (hereinafter also referred to as a "battery current"), and supplies a signal IB showing the detected value to the controller. Voltage detector 32 detects an instantaneous value of DC voltage VDC that appears between DC lines L1 and L2, and supplies a signal VDC showing the detected value to the controller. Voltage detector 34 detects an instantaneous value of battery voltage VB, and supplies a signal VB showing the detected value to the controller.

The controller includes a subtractor 50, a compensator 52, a duty ratio conversion circuit 54, an averaging circuit (AVG) 60, a setting module 62, a discharge time counter 64, and a comparator 66.

Subtractor 50 calculates a deviation between a reference voltage VDCr and DC voltage VDC that is detected by voltage detector 32.

Compensator 52 calculates a control amount that is applied for setting DC voltage VDC to be equal to reference voltage VDCr. Compensator 52 performs, for example, a control calculation including a proportional term and an integral term of the deviation calculated by subtractor 50. Compensator 52 gives the calculated control amount to duty ratio conversion circuit 54 as a voltage command value.

Duty ratio conversion circuit 54 calculates a duty ratio used for setting DC voltage VDC at the voltage command value based on the voltage command value given from compensator 52, signal VDC from voltage detector 32, and signal VB from voltage detector 34. Based on the calculated duty ratio, duty ratio conversion circuit 54 generates control signals G1 and G2 for turning on and off IGBTs Q1 and Q2 of bidirectional chopper 7. Duty ratio conversion circuit 54 outputs the generated control signals G1 and G2 to IGBTs Q1 and Q2, respectively.

Averaging circuit 60 receives signal IB from current detector 30. Based on signal IB, averaging circuit 60 calculates an average value $IB_{AVG}$ of battery current IB in one switching cycle T of bidirectional chopper 7, and outputs the calculated average value $IB_{AVG}$ to setting module 62.

Based on average value $IB_{AVG}$ given from averaging circuit 60, setting module 62 sets a discharge permissible time $DT_{lim}$. Discharge permissible time $DT_{lim}$ is a limit value of the discharge time of battery 23 during a power interruption of commercial AC power supply 21. Specifically, setting module 62 sets discharge permissible time $DT_{lim}$ in accordance with the relation shown in FIG. 6 between average value $IB_{AVG}$ of the battery current and discharge permissible time $DT_{lim}$.

Figure 6:
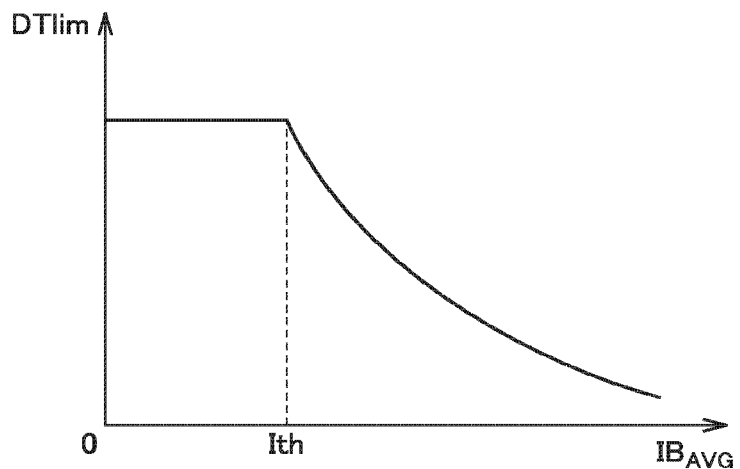
FIG. 6 is a diagram schematically showing the relation between an average value of a battery current and a discharge permissible time.

FIG. 6 is a diagram schematically showing the relation between average value $IB_{AVG}$ of the battery current and discharge permissible time $DT_{lim}$. In FIG. 6, the horizontal axis shows average value $IB_{AVG}$ of the battery current while the vertical axis shows discharge permissible time $DT_{lim}$.

Referring to FIG. 6, when average value $IB_{AVG}$ of the battery current exceeds a threshold value Ith set in advance, discharge permissible time $DT_{lim}$ is shorter as average value $IB_{AVG}$ is larger. This is based on the fact that, as the electric power supplied to load 22 increases, average value $IB_{AVG}$ also increases. Specifically, in period $t_{ON}$ during which IGBT Q2 of bidirectional chopper 7 is turned on, battery current IB flows into capacitor 9 through reactor 25 and diode D1 and is input to inverter 10. Thus, as the electric power supplied to load 22 increases and current I2 input to inverter 10 becomes higher, battery current IB also becomes higher.

Accordingly, the controller monitors average value $IB_{AVG}$ of the battery current to determine whether the electric power supplied to load 22 increases or not.

The relation shown in FIG. 6 is set such that, when battery current IB having average value $IB_{AVG}$ continuously flows, the temperature of capacitor 9 that rises due to the loss occurring in the ESR does not exceed a prescribed permissible temperature at which the performance of capacitor 9 deteriorates. In the relation shown in FIG. 6, the discharge time is constant when average value $IB_{AVG}$ is less than threshold value Ith. In other words, threshold value Ith is set such that the temperature of capacitor 9 does not exceed the permissible temperature even when battery current IB having average value $IB_{AVG}$ equal to threshold value Ith continuously flows.

Setting module 62 has a storage area (not shown) in which the relation shown in FIG. 6 between average value $IB_{AVG}$ of the battery current and discharge permissible time $DT_{lim}$ is stored in advance as a map for setting the discharge permissible time. Then, upon reception of average value $IB_{AVG}$ from averaging circuit 60, setting module 62 sets discharge permissible time $DT_{lim}$ based on the map.

The relation shown in FIG. 6 can be experimentally obtained based on the temperature of capacitor 9 detected in advance while battery current IB continuously flows and the temperature characteristics of the performance deterioration in capacitor 9. Alternatively, the relation shown in FIG. 6 may be analytically obtained by calculating the loss occurring in the ESR of capacitor 9.

When setting module 62 sets discharge permissible time $DT_{lim}$ based on the relation in FIG. 6, it outputs the set discharge permissible time $DT_{lim}$ to comparator 66.

Discharge time counter 64 measures discharge time DT of battery 23. When a power interruption occurs in commercial AC power supply 21 and discharging of battery 23 is started, discharge time counter 64 measures discharge time DT and provides the measured discharge time DT to comparator 66.

Comparator 66 determines whether or not discharge time DT measured by discharge time counter 64 exceeds discharge permissible time $DT_{lim}$. At this time, when discharge time DT does not exceed discharge permissible time $DT_{lim}$, comparator 66 determines that the temperature of capacitor 9 is lower than the prescribed permissible temperature and the performance of capacitor 9 is less likely to deteriorate. Then, comparator 66 outputs a signal STP inactivated to an L (logic low) level to duty ratio conversion circuit 54. Signal STP is used for stopping the operation of bidirectional chopper 7.

On the other hand, when discharge time DT exceeds discharge permissible time $DT_{lim}$, comparator 66 determines that the temperature of capacitor 9 is equal to or higher than the prescribed permissible temperature and the performance of capacitor 9 is more likely to deteriorate. Then, comparator 66 outputs signal STP activated to an H (logic high) level to duty ratio conversion circuit 54.

Upon reception of signal STP from comparator 66, duty ratio conversion circuit 54 generates a control signal GB used for turning off IGBTs Q1 and Q2, and then, outputs generated control signal GB to IGBTs Q1 and Q2. Upon reception of control signal GB, IGBTs Q1 and Q2 each are turned off to thereby stop the stepping-up operation of bidirectional chopper 7, and then, discharging of battery 23 is also stopped.

According to the relation in FIG. 6, when average value $IB_{AVG}$ of the battery current exceeds threshold value Ith, discharge permissible time $DT_{lim}$ is shorter as average value $IB_{AVG}$ is larger. Thus, at a high load, average value $IB_{AVG}$ increases, so that discharge time DT shortens. As a result, a temperature rise in capacitor 9 can be suppressed, so that the performance deterioration in capacitor 9 can be suppressed.

The map for setting the discharge permissible time is not limited to the map shown in FIG. 6, but may be any map as long as discharge permissible time $DT_{lim}$ is shorter as average value $IB_{AVG}$ of the battery current is larger.

As described above, the power supply device according to the first embodiment has a configuration including: bidirectional chopper 7 that performs voltage conversion for the DC voltage of battery 23; and capacitor 9 that smoothes the voltage output from bidirectional chopper 7 and outputs the smoothed voltage to inverter 10. In such a configuration, when the battery current exceeds the threshold value, the discharge permissible time is shortened as the battery current increases. Thereby, as power loss in capacitor 9 increases, the discharge time of battery 23 is shortened. Thus, a temperature rise in capacitor 9 can be suppressed, so that the performance deterioration in capacitor 9 can be suppressed.

Second Embodiment

Figure 7:
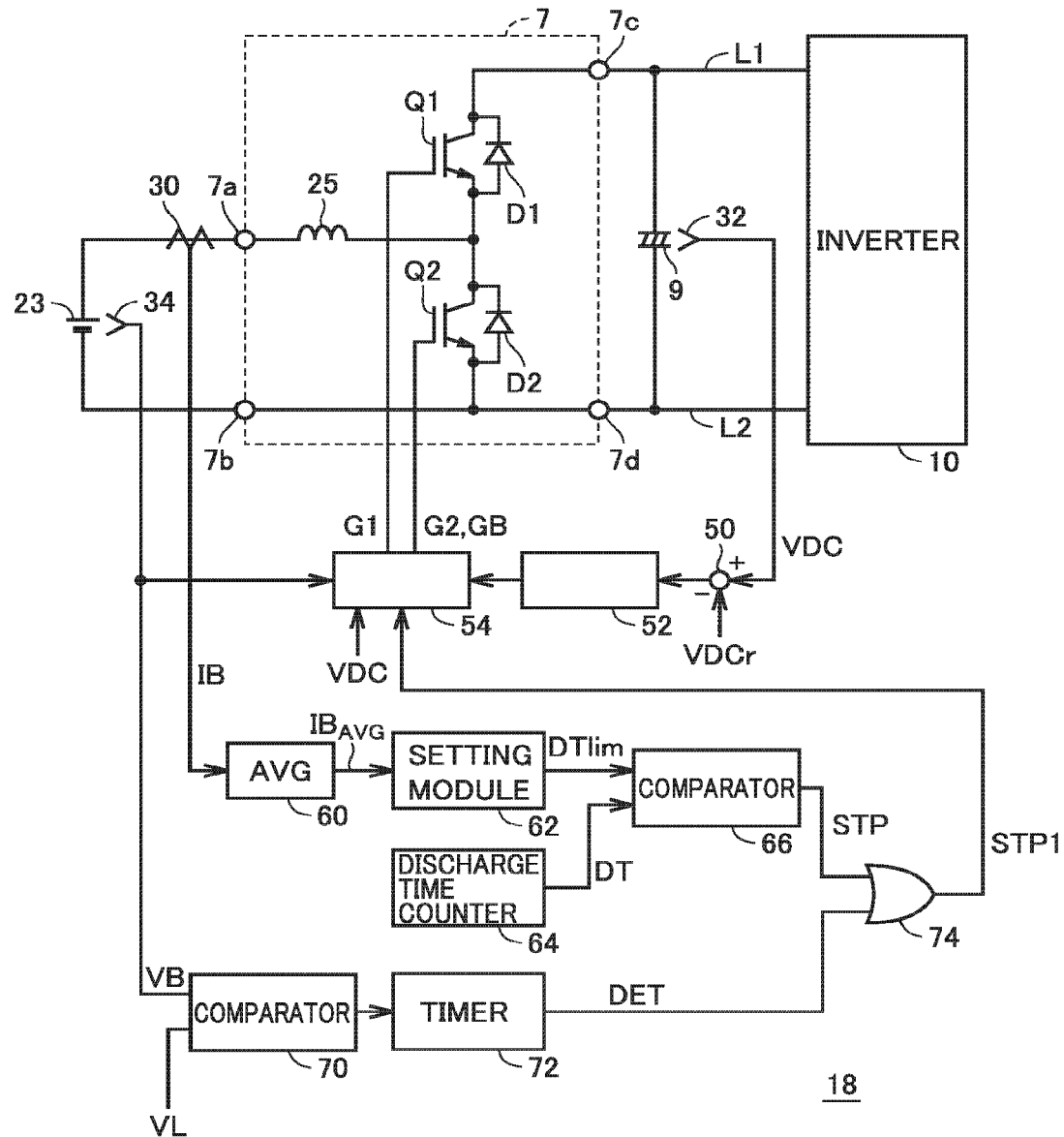
FIG. 7 is a circuit block diagram showing a configuration of a controller that controls a bidirectional chopper in an uninterruptible power supply device according to the second embodiment.

FIG. 7 is a circuit block diagram showing a configuration of a controller that controls a bidirectional chopper 7 in an uninterruptible power supply device according to the second embodiment. The controller is included in a control device 18.

The controller shown in FIG. 7 is the same as the controller shown in FIG. 5 except that the controller shown in FIG. 7 additionally includes a comparator 70, a timer 72, and an OR circuit 74. Thus, detailed description of the same portions will not be repeated.

Comparator 70 determines whether or not battery voltage VB detected by voltage detector 34 falls below a discharge cut-off voltage VL that is set in advance. Discharge cut-off voltage VL can be set based on the minimum value of the discharge voltage at which discharging can be safely performed. Discharging to the level exceeding the minimum value may deteriorate the power storage performance of battery 23.

Figure 8:
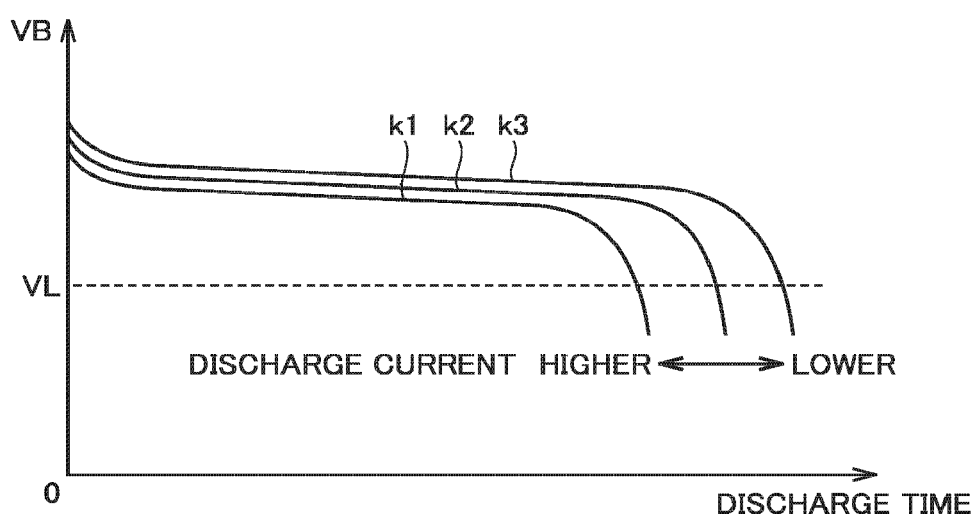
FIG. 8 is a diagram schematically showing an example of discharge characteristics of a battery.

FIG. 8 is a diagram schematically showing an example of discharge characteristics of battery 23. In FIG. 8, the horizontal axis shows discharge time while the vertical axis shows battery voltage VB.

As shown in FIG. 8, when a power interruption occurs in commercial AC power supply 21, electric power is discharged from battery 23 and supplied to load 22. As discharging of battery 23 progresses, battery voltage VB gradually lowers. When battery 23 is discharged to some extent, battery voltage VB rapidly lowers. Waveforms k1 to k3 in the figure are different in the magnitudes of the currents discharged from battery 23. Waveform k1 shows the highest discharge current, and waveform k3 shows the lowest discharge current. As the discharge current from battery 23 increases, battery voltage VB rapidly lowers.

As the current supplied to load 22 increases during a power interruption of commercial AC power supply 21, the ripple current in capacitor 9 increases and the discharge current from battery 23 increases as described above. As the discharge current from battery 23 increases, battery voltage VB rapidly lowers. Thus, battery voltage VB may reach discharge cut-off voltage VL before discharge time DT reaches discharge permissible time $DT_{lim}$.

Therefore, in the second embodiment, when discharge time DT of battery 23 exceeds discharge permissible time $DT_{lim}$ set in accordance with average value $IB_{AVG}$ of the battery current, or when battery voltage VB falls below discharge cut-off voltage VL, the stepping-up operation of bidirectional chopper 7 is stopped to thereby stop discharging of battery 23.

Specifically, in FIG. 7, when battery voltage VB is higher than discharge cut-off voltage VL, comparator 70 outputs a signal DET at an L level. When battery voltage VB lowers and falls below discharge cut-off voltage VL, comparator 70 outputs signal DET activated to an H level. When signal DET output from comparator 70 transitions from an L level to an H level, timer 72 measures the time during which signal DET is maintained at an H level. When the value measured by timer 72 reaches a prescribed threshold value, signal DET at an H level is input to one terminal of OR circuit 74.

The signal output from comparator 66 is input to the other terminal of OR circuit 74. Based on the logical sum of signal DET output from timer 72 and signal STP output from comparator 66, OR circuit 74 generates a signal STP1 and outputs the generated signal STP1 to duty ratio conversion circuit 54. Signal STP1 is used for stopping the operation of bidirectional chopper 7.

Specifically, when signal STP output from comparator 66 is at an H level or when signal DET output from timer 72 is at an H level, OR circuit 74 outputs signal STP1 activated to an H level. In other words, OR circuit 74 is configured to output signal STP1 at an H level to duty ratio conversion circuit 54 when discharge time DT exceeds discharge permissible time $DT_{lim}$ or when battery voltage VB falls below discharge cut-off voltage VL.

Upon reception of signal STP1 from OR circuit 74, duty ratio conversion circuit 54 generates a control signal GB for turning off IGBTs Q1 and Q2, and then, outputs the generated control signal GB to IGBTs Q1 and Q2. In response to control signal GB, IGBTs Q1 and Q2 each are turned off to thereby stop the stepping-up operation of bidirectional chopper 7, and then, discharging of battery 23 is also stopped.

As described above, the power supply device according to the second embodiment is configured as follows. Specifically, when the battery current exceeds the threshold value, the discharge permissible time is set to be shorter as the battery current is higher. Also, when the discharge time of battery 23 exceeds the discharge permissible time or when the battery voltage falls below the discharge cut-off voltage, bidirectional chopper 7 is stopped to thereby stop discharging of battery 23.

Thereby, a temperature rise in capacitor 9 resulting from discharging of battery 23 can be suppressed, and overdischarging of battery 23 can also be suppressed. As a result, performance deterioration in capacitor 9 and battery 23 can be suppressed.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

1 uninterruptible power supply device, 2, 8, 14, 16 electromagnetic contactor, 3, 11, 30 current detector, 4, 9, 13 capacitor, 5, 12, 25 reactor, 6 converter, 7 bidirectional chopper, 10 inverter, 15 semiconductor switch, 17 operation module, 18 control device, 21 commercial AC power supply, 22 load, 23 battery, 32, 34 voltage detector, 50 subtractor, 52 compensator, 54 duty ratio conversion circuit, 60 averaging circuit, 62 setting module, 64 discharge time counter, 66, 70 comparator, 72 timer, 74 OR circuit, T1 AC input terminal, T2 AC output terminal, T3 battery terminal, L1, L2 DC line, Q1, Q2 IGBT, D1, D2 diode.

The invention claimed is:

1. A power supply device comprising:
    an inverter that converts DC power into AC power and supplies the AC power to a load;
    a voltage converter that performs voltage conversion for a DC voltage from a battery;
    a capacitor that smoothes the DC voltage from the voltage converter and inputs the smoothed DC voltage to the inverter;
    a current detector that detects a battery current flowing from the battery into the voltage converter;
    a counter that measures a discharge time of the battery; and
    a controller that controls the voltage converter, wherein
    the controller stops the voltage converter when the measured discharge time of the battery exceeds a discharge permissible time, and
    when the battery current exceeds a threshold value during discharging of the battery, the controller sets the discharge permissible time based on an output from the current detector such that the discharge permissible time is shorter as the battery current is higher.

2. The power supply device according to claim 1, further comprising a voltage detector that detects a voltage of the battery, wherein
    the controller stops the voltage converter when the discharge time of the battery exceeds the discharge permissible time or when the detected voltage of the battery falls below a discharge cut-off voltage.

3. The power supply device according to claim 1, further comprising a converter that converts AC power from a commercial AC power supply into DC power, wherein
    when the commercial AC power supply is in a normal state, the controller controls the voltage converter to charge the battery with electric power from the converter, and
    when a power interruption occurs in the commercial AC power supply, the controller controls the voltage converter to discharge electric power from the battery to the inverter.

4. The power supply device according to claim 1, wherein the voltage converter includes
    a switching element, and
    a reactor to which a voltage switched by the switching element is applied.

5. The power supply device according to claim 2, further comprising a converter that converts AC power from a commercial AC power supply into DC power, wherein
    when the commercial AC power supply is in a normal state, the controller controls the voltage converter to charge the battery with electric power from the converter, and
    when a power interruption occurs in the commercial AC power supply, the controller controls the voltage converter to discharge electric power from the battery to the inverter.

6. The power supply device according to claim 2, wherein the voltage converter includes a switching element, and
a reactor to which a voltage switched by the switching element is applied.

7. The power supply device according to claim 3, wherein the voltage converter includes
a switching element, and
a reactor to which a voltage switched by the switching element is applied.

8. The power supply device according to claim 5, wherein the voltage converter includes
a switching element, and
a reactor to which a voltage switched by the switching element is applied.

* * * * *